United States Patent [19]
Brisbois

[11] Patent Number: 5,620,123
[45] Date of Patent: Apr. 15, 1997

[54] VEHICLE CARGO CONTAINER

[76] Inventor: Joe Brisbois, 6861 Beach Rd., Eden Prairie, Minn. 55344

[21] Appl. No.: 451,227

[22] Filed: May 26, 1995

[51] Int. Cl.$^6$ ..................................................... B60R 9/06
[52] U.S. Cl. ........................... 224/401; 224/511; 224/540
[58] Field of Search ..................................... 224/401, 488, 224/511, 540, 543, 547, 560; 296/37.1, 24.1

[56] References Cited

U.S. PATENT DOCUMENTS

| | | |
|---|---|---|
| 3,228,576 | 1/1966 | Gaukel . |
| 3,999,693 | 12/1976 | Cooper, Sr. . |
| 4,221,425 | 9/1980 | Welle et al. . |
| 4,671,439 | 6/1987 | Groeneweg . |
| 4,785,980 | 11/1988 | Redick ................................ 224/511 X |
| 4,844,528 | 7/1989 | Johnson . |
| 4,907,728 | 3/1990 | Giblet . |
| 4,957,228 | 9/1990 | Balka . |
| 5,056,695 | 10/1991 | Giblet . |
| 5,119,924 | 5/1992 | Rodic . |
| 5,314,101 | 5/1994 | White ....................................... 224/401 |

Primary Examiner—Renee S. Luebke
Attorney, Agent, or Firm—Palmatier, Sjoquist, Helget & Voigt, P.A.

[57] ABSTRACT

The present invention provides a cargo container that is removably fastenable to the rear door of a van-type vehicle. The cargo container has an upper primary hook that engages the upper edge of the vehicle's rear door and lower secondary hooks that are tightenable and that engage the lower edge of said vehicle door. The cargo container has a container portion with a front wall and an openable access door leading into the open storage area. The front wall of the container confronts the rear of the van door and has an aperture for accessing the handle of the vehicle's rear door. Thus, the rear door of the vehicle can be swung open by opening the access door of the cargo container and opening the vehicle door with the handle accessible through the opened cargo container.

20 Claims, 4 Drawing Sheets

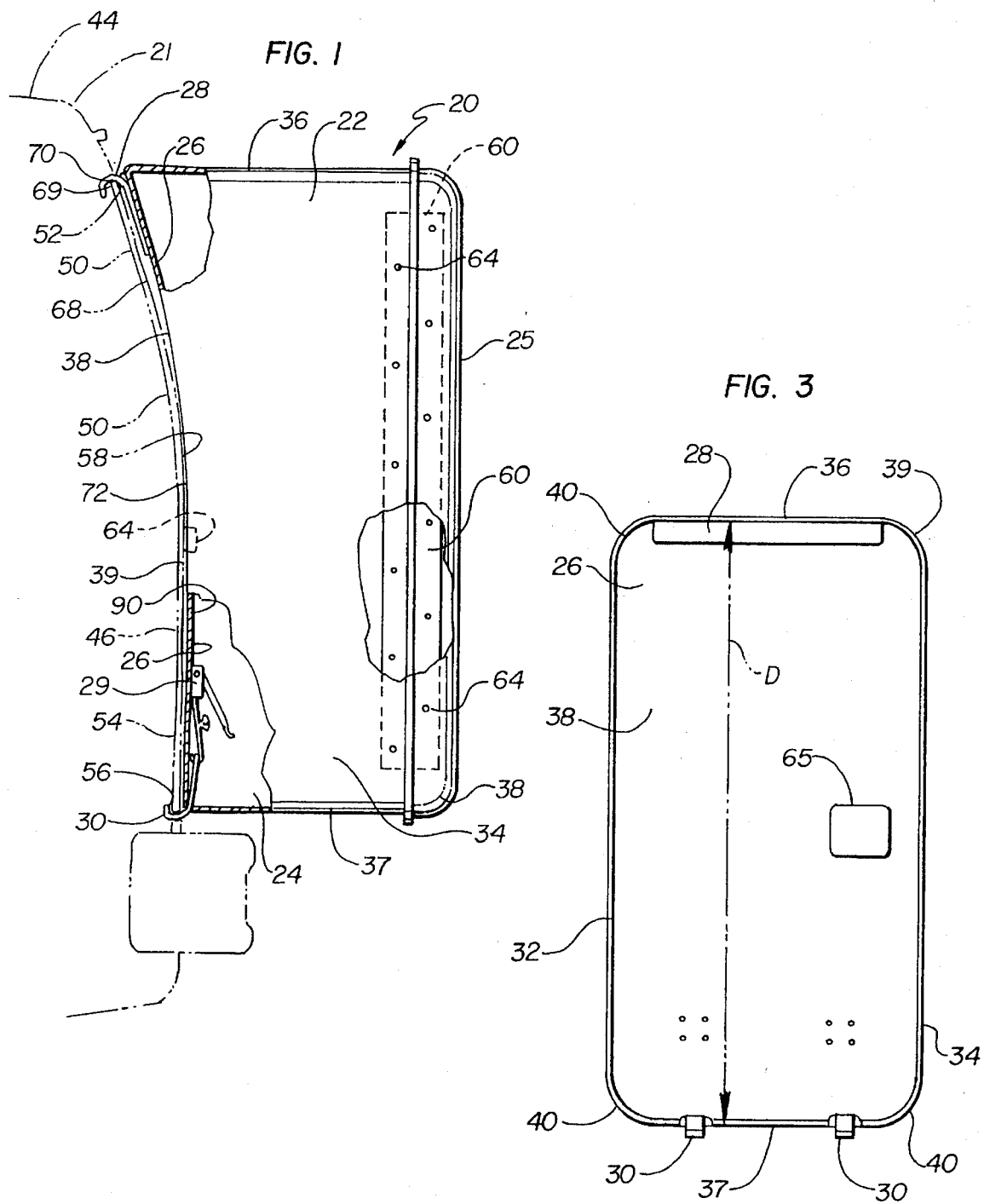

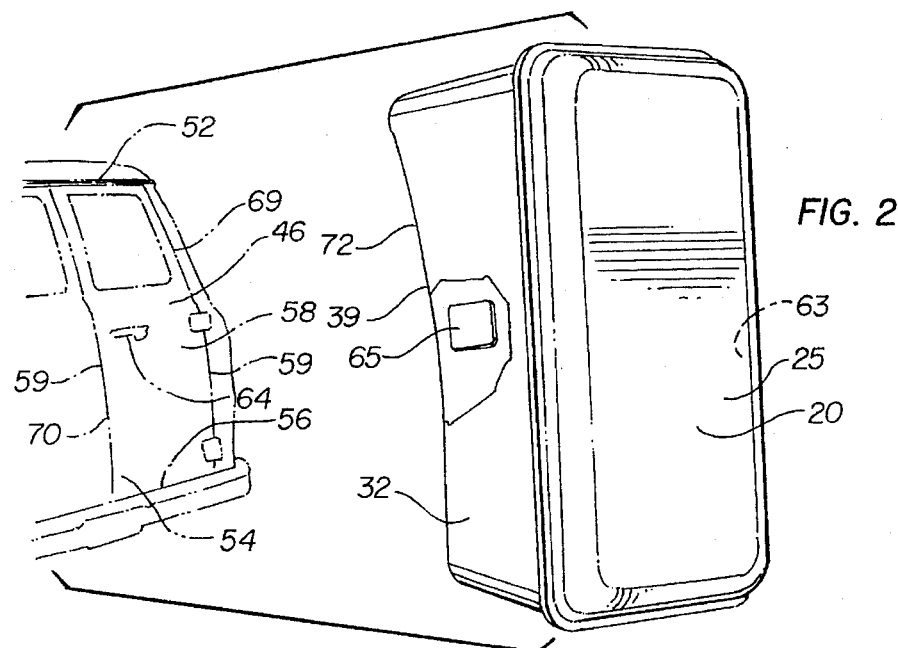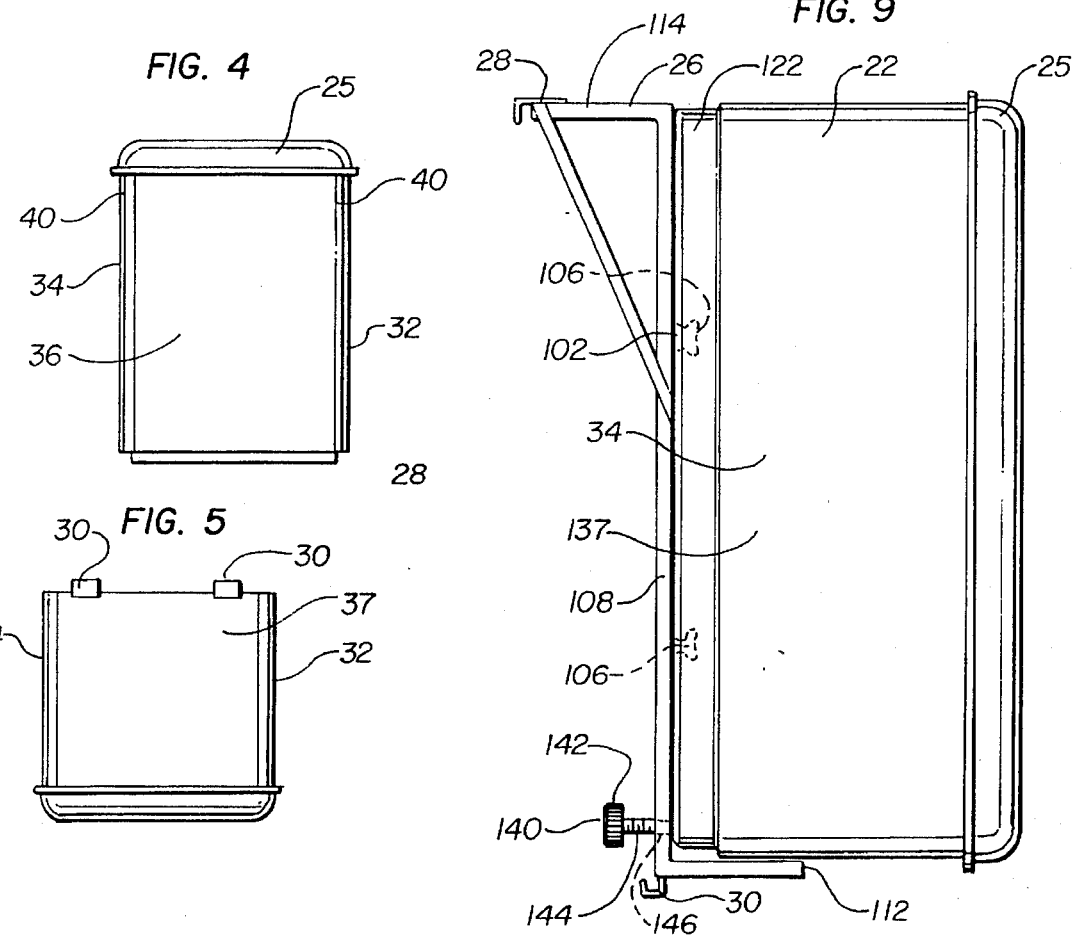

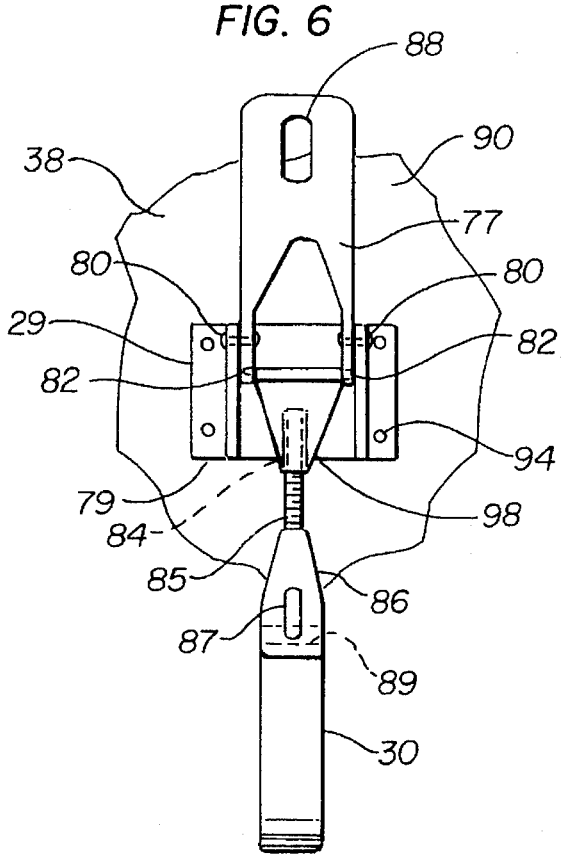
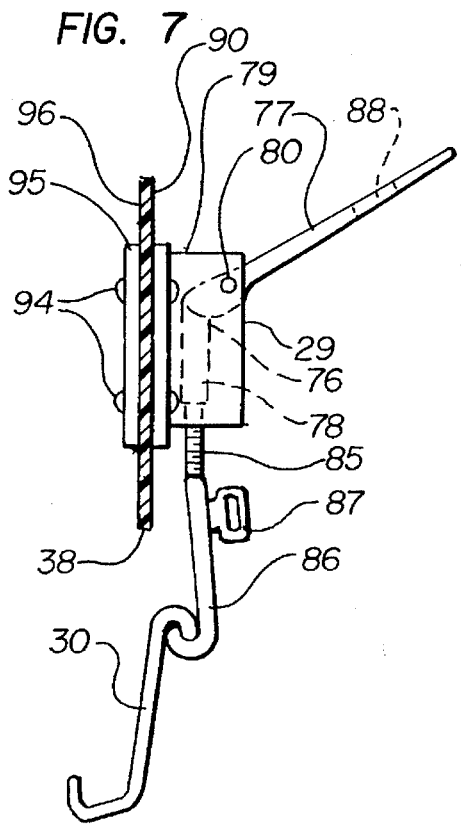
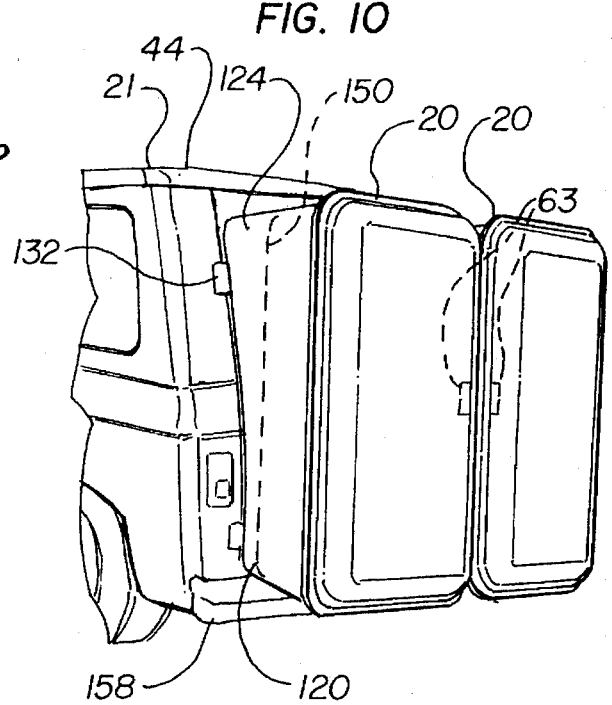

VEHICLE CARGO CONTAINER

BACKGROUND OF THE INVENTION

This invention relates to cargo carrying apparatus. More specifically, it relates to a cargo container for attachment to the rear door of a van-type vehicle.

Various means have been utilized for carrying cargo on the exterior of passenger vehicles. Oftentimes containers are mounted on the roof of the vehicle. This can make access to the container difficult. Additionally, such mounting position adds additional frontal surface area to the vehicle increasing the wind resistance and thus negatively effecting gas mileage and the vehicle handling. Also, there can be problems when the height of the vehicle when entering areas with restrictive height requirements. Additionally, such devices have an exposed frontal area that collects bugs, dirt and other debris.

Other methods have attached cargo containers to the rearward end of vehicles. These types of apparatus typically will utilize the vehicle frame or bumper to support the container. In a vehicle with a rear door access, the capability of opening the door is precluded by the installation of these types of containers. Moreover, the vehicle often has to be modified to accept such cargo containers.

It would be desirable to have a container for cargo attachable to the rear of vehicles which would not impede access to and the operability of the rear doors of such vehicles.

SUMMARY OF THE INVENTION

The present invention provides a cargo container that is removably fastenable to the rear door of a van-type vehicle. The cargo container has an upper primary hook that engages the upper edge of the vehicle's rear door and lower secondary hooks that are tightenable and that engage the lower edge of said vehicle door. The cargo container has a container portion with a front wall and an openable access door leading into an open storage area. The front wall of the container confronts the rear of the van door and has an aperture for accessing the handle of the vehicle's rear door. Thus, the rear door of the vehicle can be swung open from outside the vehicle by opening the access door of the cargo container and opening the vehicle door with the handle accessible through the opened cargo container.

A second embodiment of the invention utilizes a frame portion onto which the primary hook and secondary hooks are attached. The container portion is removably attachable to the frame portion. A separate shroud also attaches to the frame portion and is utilized to bridge the gap between the container portion and the vehicle door.

A feature and advantage of the invention is that the rear door of the vehicle is openable with the cargo container in place. The vehicle door may be opened from either inside or outside the vehicle.

A further feature and advantage of the invention is that the cargo container is accessible from ground level. This is not the case for rooftop carriers. Moreover, the rearward location of the cargo container eliminates the air drag caused by the roof-top carriers. Further, this location helps keep the cargo container clean and free from bugs, dirt, and other debris.

Another feature and advantage of the invention is that the attachment mechanisms are located inside the cargo container preventing tampering and possible theft of the cargo container when the access door of the container is shut and locked.

Another object and advantage of the invention is that the apparatus may be attached to the door without any vehicle modification.

A further object and advantage of the invention is that where the cargo container is used on vehicles with two rear doors having vertical hinges, two of the cargo containers may be mounted side-by-side with the vehicle door handles accessible and openable through the cargo container.

A further advantage of the second embodiment described above is that the container portion may be easily removed from the frame portion and utilized as a portable storage container. Moreover, different sized container portions may be used on a frame portion.

An additional advantage and feature of the invention is that the shroud portion provides an aesthetically pleasing appearance, hides the frame portion from view, and functions to minimize wind resistance of the apparatus mounted on the vehicle.

BRIEF DESCRIPTION OF THE DRAWINGS

FIG. 1 is a side elevational view of a first embodiment of the invention with portions broken away.

FIG. 2 is an exploded perspective view of the embodiment of FIG. 1 with a portion broken away showing the door handle aperture.

FIG. 3 is a front elevational view of the cargo container of FIGS. 1 and 2.

FIG. 4 is a top plan view of the apparatus of FIGS. 1–3.

FIG. 5 is a bottom plan view of the apparatus of FIGS. 1–4.

FIG. 6 is a detail front elevational view of a tightening mechanism for securing the container to the vehicle.

FIG. 7 is a side elevational view of the tightening mechanism shown in FIG. 6.

FIG. 9 is a side elevational view of the embodiment of FIG. 8 with the shroud removed.

FIG. 10 is a perspective view of two cargo containers mounted on a vehicle.

DETAILED DESCRIPTION OF THE PREFERRED EMBODIMENTS

Figure 8:
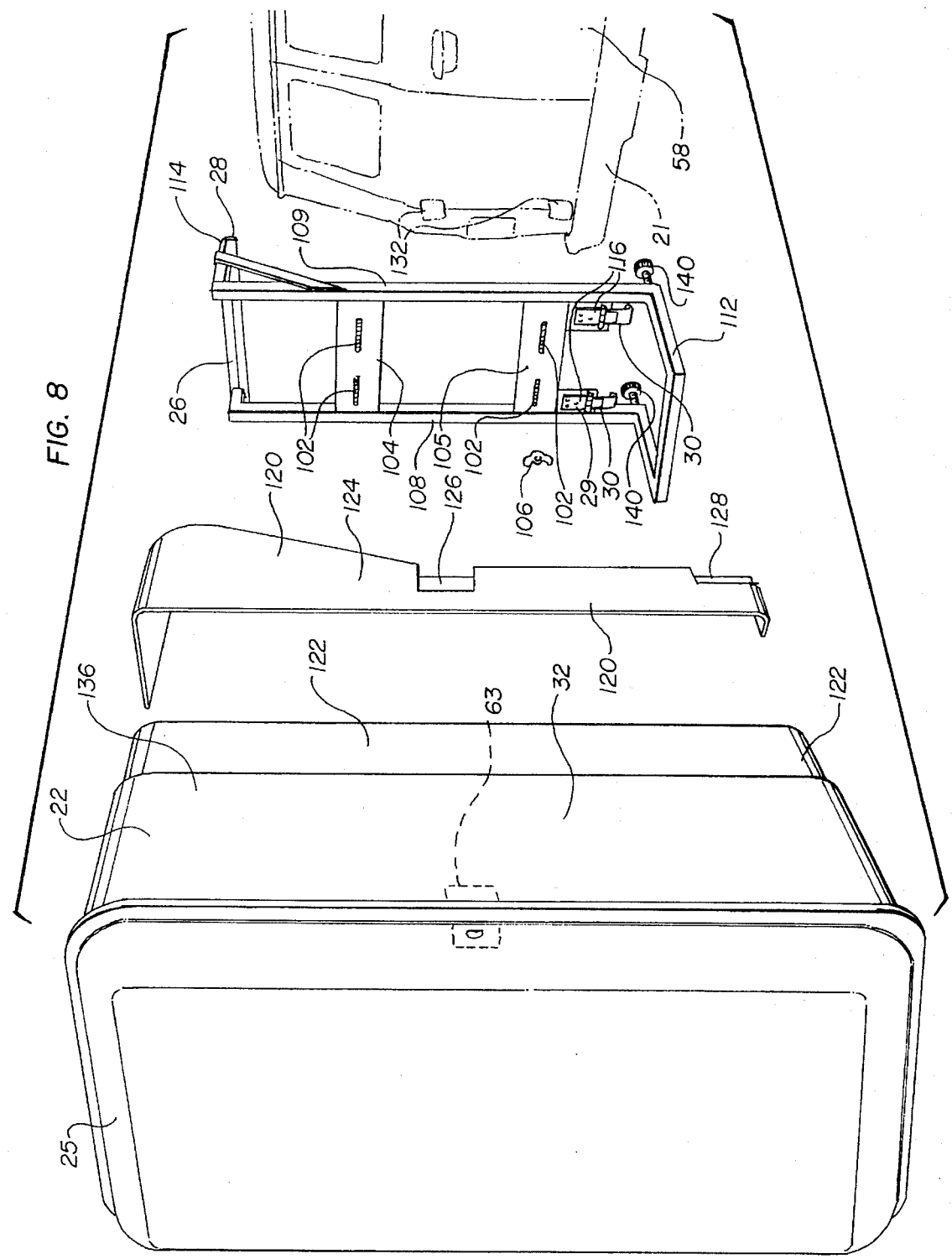
FIG. 8 is an exploded view of a second embodiment of the invention.

FIGS. 1–5 depict a first embodiment of the cargo container with the container generally indicated by the numeral 20. FIG. 1, shows the cargo container mounted on a van-type vehicle shown in phantom lines and indicated by the numeral 21. The cargo container 20 is comprised principally of a container portion 22 which defines and encloses an open interior 24, an openable access door 25 and a frame portion 26 which provides support for an upper primary hook 28, a tightening mechanism 29 and a lower secondary hook 30. The container portion 22 has a pair of opposing side walls 32, 34, a top 36, a bottom 37, and a front wall 38. The walls 32, 24 are joined to the top 36 and bottom 37 at contoured corners 40. At the front wall 38 an edge 39 confronts the rear door 46 of the vehicle.

The vehicle 21 may be a van or similar vehicle which has a rearward end 44 with a hinged rear door 46. The hinged rear door 46 has an upper portion 50 with a substantially horizontal upper edge 52, a lower portion 54 with a substantially horizontal lower edge 56 and vertical edges 59. The cargo container 20 confronts the exterior 58 of the vehicle rear door 46. A handle 57 provides for opening the rear door 46. The access door 25 is mounted and swings by way of a hinge 60 which may be mounted by way of rivets 64 or the like. The hinge 60 is suitably placed on the inside of the container portion 22. The access door 25 is secured shut by conventional door latches 63. The front wall 38 of the container portion 22 has an aperture 65 for accessing the vehicle door handle 64. The container portion 22, the frame portion 26, and the access door 25 may be formed of fiberglass by conventional means. Alternately, various rigid plastics, sheet metal or composite materials also would be suitable.

As can best be seen in FIG. 1 the cargo container 20 is supported or hung at the top edge 52 of the door 46. The edge 39 of the container preferably has a non-scratching material such as a soft fabric or elastomeric material so that the edge 39 may contact the exterior 58 of the door 46 without causing damage. The fabric or elastomeric material may be applied to the edge by conventional means such as adhesives, rivets or the like. The container 20 is secured to the door 46 by way of the tightening mechanism 29 in conjunction with the lower secondary hooks 30, one of which is shown in FIG. 1. As best shown in FIG. 3, the primary hook 28 separated from the secondary hooks 30 by a distance D. The distance D is adjustable by the tightening mechanism which effectively clamps and secures the frame portion 26 and thus the cargo container 20 to the vehicle door.

As best shown in FIGS. 1 and 2, the rear door 46 of the vehicle has a curved shape or contour 68. The cargo container edge 39 has a similar contour 72 to match said vehicle door contour 68. As best shown in FIG. 2, the vehicle rear door 46 also has a perimeter 69 with an edge or a lip 70. The cargo container 20 has an exterior shape 70, as defined by the top 36, the bottom 37, the sidewalls 32, 34 and the corners 40, which generally follows the perimeter 69 of the vehicle rear door 46.

Referring to FIGS. 1, 6, and 7, the tightening mechanism 29 is depicted. The mechanism 29 is comprised of an over-center linkage 76 which is comprised of a handle member 77 and an intermediate link 78. The handle member 77 is pivotally connected to a base portion 79 at pivot points 80 which may be rivets or the like. The handle member 77 has an end portion 82 which is pivotally connected to the intermediate link 78. The intermediate link 78 has a threaded bore 84 which receives a threaded shaft 85 which is attached to a bracket 86. Bracket 86 also has an aperture 88 for the purposes of securing the handle when it is lowered down onto said eyelet 87. Suitably attached to the bottom hook portion 89 is the secondary hook 30 which is utilized to engage the lower edge 56 of the vehicle. The secondary hooks 30 as well as the primary hook 28 may be covered with a non-scratch material such as a elastomeric coating to prevent damage to the door edges 52, 56.

An appropriate tightening mechanism is the No. 1046 adjustable catch available from the Nielsen Hardware Corporation of Hartford, Conn. The mechanism 29 is suitably mounted to the inside surface 90 of the front wall 38 of the cargo container 20 by way of rivets 94 or the like. A reinforcing plate 95 may be placed on the outside surface 96 of the front wall 38. In the embodiment of FIGS. 1–7 the frame portion 26 is generally comprised of the front wall 28 of the container portion 22.

Referring to FIGS. 8 and 9, an alternative embodiment of the invention is shown. In this embodiment the frame portion 26 is a distinct and separable component from the container portion 22. The container portion 22 is secured to the frame portion by way of the four threaded members 102 extending from cross-braces 104, 105 of the frame portion 26. Wing nuts 106 or the like are attached to the threaded members 102 in the interior 24 of the container portion 22. The frame portion has two vertical members 108, 109 and a horizontal support 112. An upper horizontal portion 114 includes the upper primary hook 28 for engagement with the upper edge 52 of the rear door 46. The tightening mechanisms 29 are fastened onto mounting plates 116 attached to the cross-braces 104, 105 and vertical members 108, 109. Only the right side of the shroud portion 120 is shown in FIG. 8. A mirror image opposing shroud portion 124, as shown in FIG. 10, is on the left side. The shroud portion 120 fits over a recessed area 122 of the container portion 22 to close the gap between the container portion 22 and the exterior 58 of the rear door. The shroud portion 22 has opposing side panels 125 and hinge recesses 126, 128 to accommodate the vehicle's rear door hinges 132. The shroud portion 120 may be attached by way of screws or other suitable fastening devices to the frame portion 26 and/or the recessed area 122. In the embodiment as shown in FIGS. 8 and 9, there would be two shroud portions, one for each side 136, 137 of the cargo containers 120.

In this embodiment a foot 140 comprising a door contact member 142 and a threaded extension member 144 are utilized to provide horizontal stability and support for the cargo container 20. The extension member is threaded into an appropriate threaded receiver 146 on the frame portion 26. The frame portion 26 as shown in FIGS. 8 and 9 may be fabricated from steel by conventional means such as welding or bolting.

The device operates as follows: Preferably with the vehicle door 46 open, the upper primary hook 28 is engaged over the upper edge 52 of said door 46. The frame portion 26 is allowed to rest against the exterior 58 of the door 46 such as by the edge 39 contacting the door exterior 58 for the first embodiment described above in FIGS. 1–5, or by way of the feet contacting the lower portion 54 of the door. Notably, the feet 140 are adjustable to vary the distance between the frame portion 26 and the vehicle door 46. The tightening mechanisms 29 are then put in the relaxed mode which, for the device shown in FIGS. 6 and 7, is by way of lifting the handles 88 and by rotating the bracket 86 to unscrew the threaded shaft 85. The secondary hooks 30 are engaged with the lower edge 56 of the vehicle door 46. The secondary hooks 30 are suitably attached to the brackets 86 and the tightening mechanisms 29 are utilized to put sufficient tension on the secondary hooks 30 to adequately secure the cargo container to the vehicle door 46. The tightening mechanisms 29 are adjusted in this process by way of rotation of the bracket 86 until the tension is appropriate when the handle 88 is closed to the bracket 86. In such a position the eyelet 87 will extend through the aperture 88 in the handle to allow for a padlock or similar securement. Other configurations of tightening mechanisms would also be suitable.

In the second embodiment shown in FIGS. 8 and 9, the container portion 22 is then positioned on the frame portion 26. The container portion 22 is secured by way of the wing nuts 106 threaded onto the threaded members 102. Also for the second embodiment, the shroud 120 may be suitably attached to the frame portion 26 by screws or the like either before or after the placement of the container portion 22 on the frame portion 26.

As best shown in FIG. 9, the upper primary hook 28 may be configured to contact and engage the exterior 58 of the vehicle door 46 in addition to the upper edge 52.

Referring to FIG. 10, two cargo containers 20 are shown mounted on the rearward end 44 of a vehicle 21. The cargo containers 20 as depicted may be either of the two embodiments described above. The dotted line 150 shows the region where the shroud portion 120 would meet the container portion 22 for the second embodiment described. As shown, the cargo containers 20 are supported exclusively by way of the vehicle door and do not rely upon the vehicle bumper 158 or other portions of the vehicle 21 for support. This allows the vehicle doors to be opened without removal of the cargo containers.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention. For example the container portion 22 is depicted as extending from the upper edge 52 of the vehicle door 46 to the lower edge 56. The container portion 22 does not need to extend said full length of the door and may have the bottom 37 positioned part way up the door and/or have the top 36 positioned part way down the vehicle door.

What is claimed:

1. A cargo container for attachment to a vehicle having a rearward end with hinged rear door that swings open, the door having an exterior, an upper portion with a substantially horizontal upper edge, and a lower portion with a substantially horizontal lower edge, the cargo container comprising:

a rigid upright frame portion for extending along the exterior of the rear door from the lower portion to the upper portion when said container is attached to the vehicle;

a container portion connected to the frame portion, the container portion comprised of an openable access door and having an open storage area, whereby the open storage area is accessible through the access door when the access door is open; and the frame portion removably attachable to the upper edge and the lower edge of the vehicle door, the frame portion and container portion sized to permit the rear door to swing open when the cargo container is attached to the door.

2. The cargo container of claim 1, further comprising a primary hook and a secondary hook for removably attaching the cargo containers to the vehicle door, the primary hook extending from the top portion of the frame portion, the hook engagable on the horizontal upper edge of the door whereby the frame portion is suspended from said edge, the secondary hook connected to the frame portion, the secondary hook engagable with the lower edge and adjustable inwardly and outwardly with respect to the frame portion whereby the frame portion may be secured to and supported by the rear door and whereby when the container is mounted on said rear door the rear door is openable.

3. The cargo container of claim 1 wherein the container portion is removably connected to the frame portion.

4. The cargo container of claim 1, wherein the vehicle rear door has a handle for opening said door and wherein the container portion further comprises a front wall which confronts the exterior of the vehicle rear door when the cargo container is mounted thereon, the front wall having an aperture for accessing the handle through the open storage area when the cargo container is attached to the vehicle.

5. The cargo container of claim 1, further comprising a primary hook and a secondary hook for removably attaching the cargo containers to the vehicle door, the primary hook extending from the top portion of the frame portion, the hook engagable on the horizontal upper edge of the door whereby the frame portion is suspended from said edge, the secondary hook connected to the frame portion, the secondary hook engagable with the lower edge and adjustable inwardly and outwardly with respect to the frame portion whereby the frame portion may be secured to and supported by the rear door and whereby when the container is attached to the vehicle said rear door is openable and the cargo container further comprising an over center mechanism attached to the secondary hook and the frame portion whereby the secondary hook is adjustable inwardly and outwardly with respect to the frame portion by the over center lever mechanism.

6. The cargo container of claim 1 wherein the frame portion is integral with the container portion.

7. The cargo container of claim 1 further comprising a foot for contacting the exterior of the vehicle rear door when the cargo container is attached to the vehicle, the foot comprising a door contact portion connected to an extension member, the foot extending from the frame portion by way of the extension member, the foot positioned such that when the cargo container is mounted on the door, the foot is intermediate the upper edge and the lower edge of the rear door.

8. The cargo container of claim 7 wherein the extension member of the foot is comprised of an adjustable shaft whereby the extension of the foot from the frame portion may be adjusted.

9. The cargo container of claim 1, wherein the rear door of the vehicle has a contour and the container further comprises a shroud portion with a forward edge, whereby when the container is mounted on said door the shroud portion extends from the container portion toward the rear door of the vehicle, the forward edge configured to follow the contour of the door.

10. The cargo container of claim 9 wherein the forward edge of the shroud portion is configured such that when the container is mounted on said door the forward edge contacts the exterior of the rear door of the vehicle.

11. The cargo container of claim 1, wherein the rear door of the vehicle has a contour and the container further comprises a shroud portion with a forward edge, the shroud portion configured such that when the container is attached to the vehicle the shroud portion extends from the container portion toward the rear door of the vehicle, the forward edge configured to follow the contour of the exterior door when so attached.

12. The cargo container of claim 11 wherein the shroud portion is detachable from the container portion.

13. A cargo container for attachment to a vehicle, the vehicle having a rearward end with a hinged rear door at said end, the door having an exterior, an upper portion, a lower portion, and an edge extending around the door edge, the cargo container comprising:

a rigid upright frame portion configured such that said frame portion extends along the exterior of the door when the cargo container is attached to the vehicle;

a container portion removably connected to the frame portion, the container portion having an open storage area; and a primary hook and a secondary hook extending upwardly and downwardly from the frame portion in substantially opposite directions, the hooks engagable on the edge of the door, the secondary hook adjustable inwardly and outwardly whereby the frame portion may be secured to said edge whereby the cargo container is attached to the vehicle.

14. The cargo container of claim 13 further comprising:

a tightening mechanism attached to the frame portion, the tightening mechanism connected to the secondary hook whereby the secondary hook is adjustable inwardly and outwardly with respect to the frame portion, the tightening mechanism comprised of an over center linkage.

15. The cargo container of claim 13 wherein the primary hook is also adjustable inwardly and outwardly.

16. The cargo container of claim 13, wherein the vehicle door has an upper edge and a lower edge and wherein the cargo container primary hook extends upwardly from the frame portion for attachment to the upper edge and the secondary hook extends downwardly from the frame portion for attachment to the lower edge.

17. A cargo container for attachment to a vehicle, the vehicle having a rearward end with a hinged rear door at said end, the door having an exterior, an upper portion with a substantially horizontal upper edge, and a lower portion with a substantially horizontal lower edge, the cargo container comprising:

a rigid upright frame portion configured for extending up the exterior of the door from the lower portion to the upper portion when the cargo container is attached to the vehicle, the frame portion having a top portion and a bottom portion;

a container portion removably connected to the frame portion, the container portion comprised of an openable access door and having an open storage area, whereby the open storage area is accessible through the access door when said door is open;

a primary hook extending from the top portion of the frame portion, the hook engagable on the horizontal upper edge of the door whereby the frame portion may be suspended from said edge;

a secondary hook engagable with the lower edge of the vehicle door; and a tightening mechanism attached to the frame portion, the tightening mechanism configured to adjust the distance between the primary hook and the secondary hook whereby the frame portion may be secured to and supported by the rear door.

18. The cargo container of claim 17 further comprising a foot for contacting the exterior of the rear door, the foot comprising a door contact portion connected to an extension member, the foot extending from the frame portion by way of the extension member, the foot positioned on the frame portion such that the door contact portion may contact the exterior of the door when the container is attached to said door.

19. The cargo container of claim 17, wherein the vehicle rear door has a handle for opening said door and wherein the container portion further comprises a front wall confronting the exterior of the vehicle rear door, the front wall having an aperture for accessing the handle through the open storage area when the cargo container is attached to the vehicle.

20. A cargo container for attachment to a vehicle, the vehicle having a rearward end with a hinged and openable rear door, the rear door having an exterior and a perimeter with an edge, the cargo container comprising:

a rigid upright frame portion for extending along the exterior of the rear door when the container is attached to the vehicle;

a container portion joined to the frame portion, the container portion comprised of sidewalls and an openable access door and having an open storage area, whereby the open storage area is accessible through the access door when said door is open; and the frame portion removably attached to the rear door, the sidewalls positioned to substantially follow the perimeter of the rear door when the container is attached to the vehicle, whereby said rear door is openable when the cargo container is attached to the vehicle.

* * * * *